United States Patent

[11] 3,623,614

| [72] | Inventor | Henry Schmidt, Jr.<br>Hinsdale, Ill. |
|---|---|---|
| [21] | Appl. No. | 789,642 |
| [22] | Filed | Dec. 11, 1968 |
| [45] | Patented | Nov. 30, 1971 |
| [73] | Assignee | Industrial Filter & Pump Mfg. Co.<br>Cicero, Ill. |

[54] FILTER LEAF CORE
5 Claims, 4 Drawing Figs.

[52] U.S. Cl. ................................................. 210/486,
    210/346
[51] Int. Cl. ....................................................... B01d 25/04
[50] Field of Search ........................................ 210/331,
    347, 227, 228, 226, 231, 486, 498, 346

[56] References Cited
UNITED STATES PATENTS

| 2,594,518 | 4/1952 | Teale | 210/231 |
| 2,799,397 | 7/1957 | Berline | 210/231 |
| 2,901,115 | 8/1959 | Schmidt, Jr. et al. | 210/486 X |
| 2,964,194 | 12/1960 | Oliver, Jr. et al. | 210/347 X |
| 3,241,678 | 3/1966 | Wrotnowski | 210/231 |
| 3,278,033 | 10/1966 | Winterstein | 210/486 X |
| 3,497,065 | 2/1970 | Johnson, Jr. | 210/231 |

FOREIGN PATENTS

| 1,384,810 | 11/1964 | France | 210/486 |
| 570,277 | 12/1957 | Italy | 210/486 |

OTHER REFERENCES

Design Manual TA-40R, U.S. Stoneware Co., Akron, Ohio, p. 15 (1961).

*Primary Examiner*—J. L. DeCesare
*Attorney*—Fidler, Bradley, Patnaude & Lazo

ABSTRACT: A core for a filter leaf for use in a pressure filter tank includes a pair of thin rubber sheets bonded to opposite faces of a fiber glass reinforcing panel. Each outer sheet has a multiplicity of outwardly extending studs in the form of tubular protrusions which define therebetween a plurality of fluid-distributing troughs.

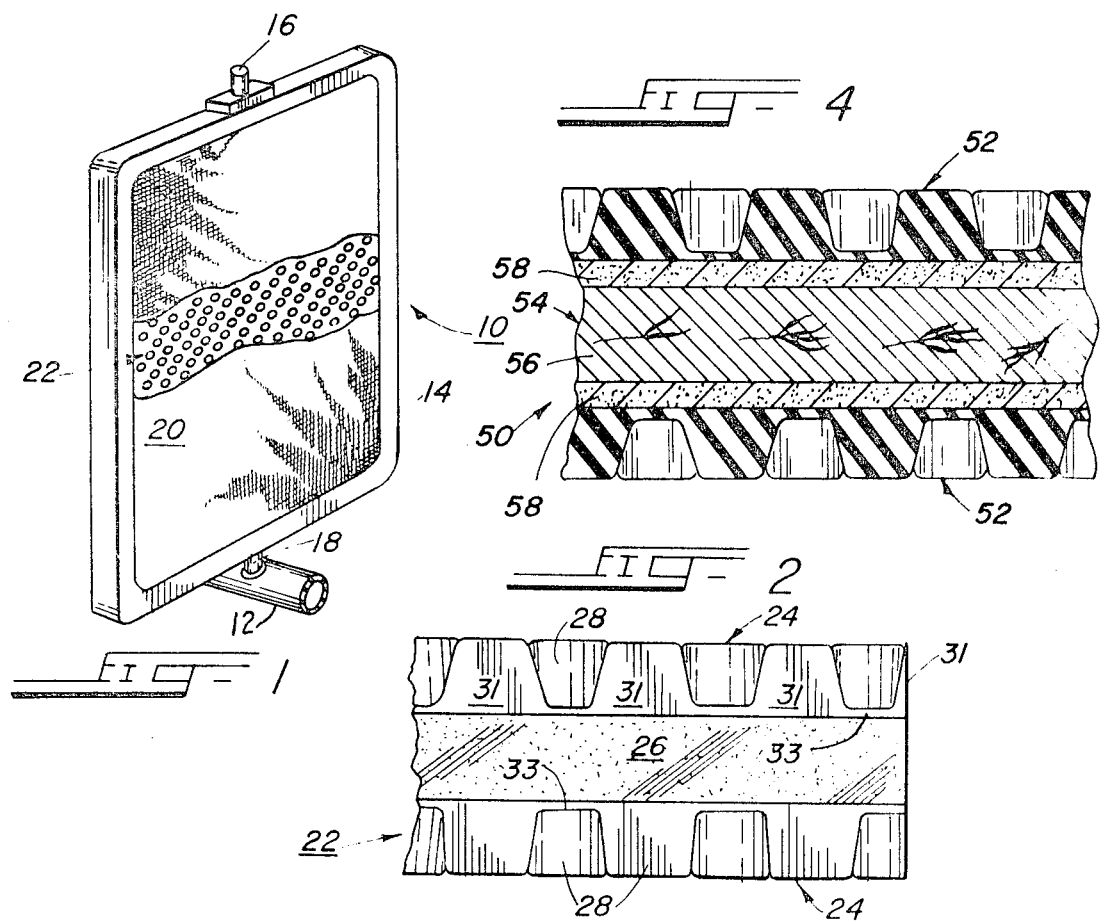
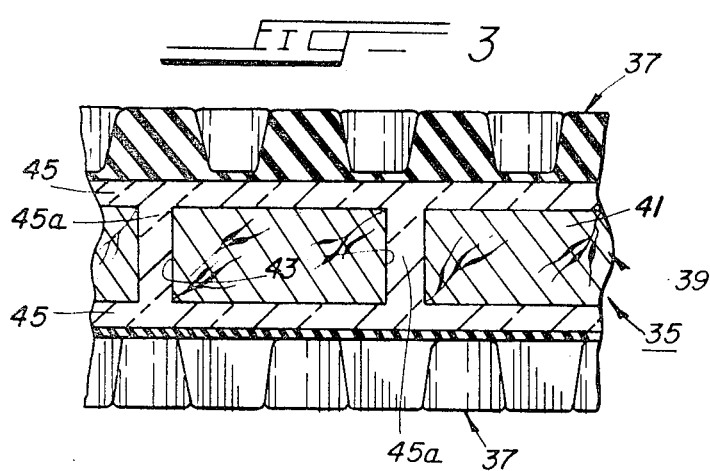
INVENTOR.
HENRY SCHMIDT, JR.

FILTER LEAF CORE

BACKGROUND OF THE INVENTION

This invention relates to a filter leaf for use in a pressurized filter tank, and it more particularly relates to a filter leaf core which is adapted to be mounted in a filter leaf frame between a pair of filter screens.

Filter leaves of the type with which the present invention may be employed are generally mounted in a pressurizable filter tank and connected in fluid communication to a common outlet manifold so that the liquid to be filtered which is pumped into the tank flows through the leaves into the outlet manifold. Since the particles to be removed from the liquid are too large to penetrate the porous precoat layers built up on the perforate faces of the leaves, the particles are deposited in the form of a filter cake on each of the porous precoat layers of the filter leaves, and the remaining liquid passes through the faces of the leaves and enters the outlet manifold.

In one common type of filter leaf construction, the leaf comprises a core, a pair of screens or sheets of fine-mesh fabric material on opposite faces of the core to provide surfaces upon which the precoat layers are built, and a continuous channel-shaped frame surrounding the core to convey the filtered fluids to an outlet manifold via a suitable connector. The core is composed of a pair of rubber sheets bonded to the opposite faces of a thin, reinforcing plate composed of steel or other metal. The rubber sheets have a multiplicity of outwardly extending studs in the form of tabular protrusions on the opposite faces of the core to provide a back drain consisting of a multiplicity of interconnected troughs or paths. This prior art core is not entirely satisfactory since the steel plate is frequently bent beyond its elastic limit during use and thus takes a set. Moreover, the extreme bending of the core often times causes the rubber sheets to crack, thus exposing portions of the steel plate to the chemicals used in the process, whereby the steel plate contaminates the liquids passing through the filter. Also, in certain extreme cases of bending, massive bending of the steel plate results in self-destruction of the core. Furthermore, imperfections in the rubber sheets also cause the steel plates to be exposed to the corrosive chemicals used in the filtering process. To overcome the tendency of the leaf to bend with the consequent problems discussed above, thicker plates are used, but this is an undesirable approach to the problem since it increases both the weight and cost of the leaf.

SUMMARY OF THE INVENTION

Therefore, it is the principal object of the present invention to provide a new and improved filter leaf.

Another object of the present invention is to provide a new and improved filter leaf core which is resilient and which does not react with the chemicals used in the filtering process.

Briefly, the above and further objects are realized in accordance with the present invention by providing a filter leaf core which includes a fiber glass laminate material and a pair of thin flexible sheets which are bonded to the fiber glass material and which have a plurality of outwardly extending studs to provide the back drain. The fiber glass material is light in weight, resilient, and has a high elastic limit so that it snaps back to its original position after use. Moreover, the core is chemically inert and thus does not react with the chemicals used in the filtering process. The flexible sheets are relatively thin as compared to the other material of which the core is composed and are not relied upon to add to the structural strength of the core so that they are less likely to crack or tear in use. Furthermore, the leaf of the present invention is less expensive to manufacture since a smaller amount of rubber is required and since the core can be made in essentially a single molding operation.

BRIEF DESCRIPTION OF THE DRAWINGS

The invention, both as to its organization and method of operation, together with further objects and advantages thereof will best be understood by reference to the following detailed description taken in connection with the accompanying sheet of drawings wherein:

FIG. 1 is an isometric view of a filter leaf with a portion thereof broken away to partially expose the filter leaf core of the present invention;

FIG. 2 is an enlarged side elevational view of a corner portion of the filter leaf core of FIG 1;

FIG. 3 is an enlarged cross-sectional view of a portion of another filter leaf core constructed in accordance with the present invention; and FIG. 4 is an enlarged cross-sectional view of a portion of still another filter leaf core constructed in accordance with the present invention.

DESCRIPTION OF THE PREFERRED EMBODIMENTS

Referring now to the drawings and more particularly to FIG. 1 thereof, there is shown a filter leaf 10 which is mounted on an outlet manifold 12 in a hermetically sealed pressurizable tank (not shown in the drawings). The filter leaf 10 comprises a channel-shaped frame 14 which is mounted in the tank by means of a support bracket 16 at its top edge and a connector pipe 18 at its bottom edge for connecting the filter leaf in fluid communication with the outlet manifold 12, a pair of fine-mesh screens 20 (the rear screen is not shown in the drawings), or sheet of fine-mesh fabric material if desired, for supporting a porous precoat layer (not shown), and a core 22 surrounded by the frame 14 between the pair of spaced-apart screens 20. As illustrated in FIG. 1, the frame 14 is generally rectangular in shape, but it is to be understood that the core of the present invention could be used in various different frames having various different shapes, such as a circular frame. In use, the fluid to be filtered is pumped into the filter tank and is forced through the faces of the filter leaf 10. As a result, certain materials, such as impurities which are too large to pass through the porous precoat layer and/or the screens 20, are deposited on the faces of the screens 20, and the remaining fluid passes through the faces of the screens 20 and is guided via a plurality of interconnected troughs or channels in the irregular surfaces of the core 22 to the manifold 12 via the connector pipe 18.

Considering now the filter leaf core 22 in greater detail with particular reference to FIG. 2 of the drawings, the filter leaf core 22 generally comprises a pair of coating layers 24 of flexible material, such as rubber, and a hard, resilient reinforcing panel 26 which id disposed between and bonded to the flexible layers. The reinforcing panel 26 is composed of fiber glass laminate, such as the fiber glass laminate commonly known as fiber glass reinforced plastic, and is cut in a rectangular shape to fit the filter frame 14. The fiber glass laminate panel 26 provides the core 22 with sufficient resiliency to enable the core 22 to be used in high-pressure filter tanks, and since it has a higher elastic limit than the elastic limit for metal, permanent deformation of the core 22 and cracking of its rubber layers 24 is prevented. Moreover, the fiber glass laminate material of the panel 26 does not react with the chemicals used in the filtering process, and it is relatively light in weight.

Each of the coating layers 24 comprise a thin, flexible sheet of soft or hard rubber or the like plastic material, but hard rubber is preferred. The sheets 24 have a plurality of outwardly extending studs 28 in the form of tabular protrusions. In order to provide a plurality of troughs or channels opening into the marginal edges of the core 22 for conveying the fluid passing through the screens 20 to the connecting pipe 18 via the frame 14, each of the studs 28 is equally spaced in straight line rows, and each of the rows of studs is staggered one with respect to the next to provide an interconnected, irregular path for conveying the fluid passing through the screens 20.

In manufacturing the core 22, the rubber sheets 24 may be molded, and then cut to fit the panel 26. As shown in FIG. 2, in cutting the sheets 24 to fit the panel 26, some of the end rows of studs 28 may be cut in half or less, such as the cutaway studs 31 forming the end row of studs adjacent the edge of the core 22. Since the areas 33 of the rubber sheets 24 between the studs 28 are relatively narrow in cross section as compared to the thickness of the reinforcing panel 26, and since the difference in the coefficient of thermal expansion between the rubber sheets 24 and the panel 26 is relatively small, the rubber sheets 24 do not tend to crack or tear during the use of the filter leaf 10. Moreover, cracking or tearing of the rubber sheets 24 are prevented by virtue of the fact that the sheets 24 are not relied upon to provide the structural strength of the core 22.

In manufacturing the core 22, a pair of raw rubber sheets, which may be chemically treated for vulcanizing purposes if desired, is bonded to the panel 26 by means of a suitable adhesive which is applied between the pair of rubber sheets and the panel 26. Thereafter, in order to complete the manufacturing process in a single operation, the rubber sheets 24 and the panel 26 are compressed and molded between a pair of heated mold members (not shown) to set the adhesive and to mold the studs 28. At the same time, the rubber sheets are also vulcanized. During the molding operation, the rubber sheets are heated to a temperature within the range of 300° to 350° F., thereby molding the rubber sheets into the back-drain profile and curing the adhesive to strengthen the chemical bond between the sheets 24 and the panel 26.

Referring now to FIG. 3, there is shown a filter leaf core 35, which is another filter leaf core according to the present invention. The filter leaf core 35 is similar to the core 22, but the core 35 includes a hard resilient panel that is composed of both fiber glass laminate and fiberboard. AS shown in FIG. 3, the filter leaf core 35 generally comprises a pair of spaced-apart, flexible sheets 37, which are identical to the sheets 24 of FIG. 2, and a hard, resilient reinforcing panel 39 disposed between and bonded to the sheets 37 in the same manner as described above in connection with the core 22 of FIG. 2. The panel 39 generally comprises a fiberboard plate 41 having a plurality of holes 43 extending therethrough and a pair of spaced-apart fiber glass laminate plates 45 to which the sheets 37 are secured. The plates 45 include a plurality of posts 45a which extend through the holes 43 and which are integrally connected to the plates 45.

The fiberboard panel 39 may be composed of different types of fiberboard or chipboard, such, for example, as the fiberboard commonly known as Masonite. The use of the fiberboard plate 41 enables the overall cost of the panel 39 to be somewhat less than the cost of the fiber glass laminate panel 26 of the core 22, and yet the weight of the panel 39 is similar to the weight of the panel 26. The fiber glass laminate plates 45 and its posts 45a are composed of a fiber glass laminate, such as the laminate commonly known as fiber glass reinforced plastic. Thus the panel 39 possesses the quality of resiliency in accordance with the object of the present invention.

Referring now to FIG. 4, there is shown a filter leaf core 50, which is still another filter leaf core in accordance with the present invention. The filter leaf core 50 is similar to the core 35, but the core 50 includes a pair of sheets of fiber glass laminate matted fabric material. As shown in FIG. 4, the filter leaf core 50 generally comprises a pair of spaced-apart, flexible sheets 52, which are identical to the sheets 24 of FIG. 2, and a hard-resilient reinforcing panel 54 disposed between and bonded to the sheets 52 in the same manner as described above in connection with the core 22 of FIG. 2. The panel 54 comprises a fiberboard plate 56 and a pair of sheets 58 which are composed of fiber glass matted material and which are bonded to the opposite faces of the fiberboard plate 56. The rubber sheets 52 are bonded to the sheets 58 of the fiber glass matted material.

The fiber glass matted material 58 is commonly known as woven roving and comprises fabric material which is woven of fiber glass threads and saturated with epoxy or other suitable resin. Such material has a relatively high tensile strength as compared to the sheets of fiber glass laminate material used in the filter leaf core 22 and 35 as a result of the relatively high density of fiber glass. Since the fiber glass threads extend in two different directions, the woven roving sheets 58 have maximum strength in both directions. Moreover, the fiber glass matted material has the ability to withstand relatively high pressures during use in filtering apparatus. Each of the fiber glass threads of woven roving comprises 300 to 500 strands of fiber glass. The woven roving has a 4×5 matrix of threads per square inch and has a tensile strength of 1,000 pounds per square inch.

In manufacturing the filter leaf core 50, the sheets of woven roving are saturated with epoxy or other suitable resin. The excess resin is squeezed from the woven roving, and then the saturated woven roving sheets are permitted to harden and become crystallized at room temperature or at a relatively higher temperature. This preliminary curing process is commonly known in the art as B-stage curing. The preliminary B-stage curing process facilitates handling of the saturated sheets of woven roving, however it is to be understood that if desired, for some applications the preliminary B-stage curing process may be eliminated. Thereafter, the sheets of woven roving are placed on the opposite faces of the fiberboard plate 56. The two rubber sheets, which are treated for vulcanizing purposes, are then placed on the opposite faces of the sheets of B-stage-cured woven roving.

In order to complete the manufacturing process in a single operation, the thus-assembled sheets of material are placed between a pair of heated mold members (not shown) and compressed. The molds are heated to a temperature within the range of 270° F. and 300° F., and compressed at a pressure of more than 500 pounds per square inch. As a result, the drainage profile of the rubber sheets 52 are thus formed, and the sheets 52 are vulcanized. Moreover, the heat applied during the manufacturing process causes the B-stage woven roving to melt and thus enter its final curing stage after the core 50 is cooled to room temperature. In its final cured state, the woven roving sheets 58 are in a permanent nonmelting state. In addition, the woven roving sheets 58 are thus bonded to the rubber sheets 52 and the fiberboard plate 56 without the need for applying an adhesive. In this regard, a strong molecular bond is formed between the rubber sheets 52 and the sheets 58 of woven roving and also between the permanently cured woven roving sheets 58 and the fiberboard plate 56. The fiberboard plate 56 is able to withstand the mold temperatures and compressive pressures applied during the molding process and still provide the core 50 with good flexural strength and resiliency. Thus, the above-described manufacturing process for the core 52, as well as the process for manufacturing the cores 22 and 35, is a dry molding process, and therefore no sticky or liquid substances are required.

In view of the foregoing description, it should now be apparent that there is provided in accordance with the present invention an economically constructed filter leaf core and a method of making it. The core has a center panel which is at least partially composed of fiber glass laminate material which has a high elastic limit to prevent permanent deformation of the core and cracking of the outer rubber sheets and which is relatively light in weight. Moreover, the filter leaf core of the present invention is composed entirely of materials which are relatively inert and thus are compatible with the fluid chemicals used in the filtering process. The outer, flexible sheets are relatively thin in their area between the studs as compared to the thickness of the center reinforcing panel so that the sheets do not tend to crack or tear away from the center panel during the use of the filter leaf, and as a result the thin flexible sheets are not relied upon for structural strength. Cracking of the flexible sheets is also prevented due to the relatively small difference in the coefficient of expansion between the sheets and the fiber glass material.

While the present invention has been described in connection with particular embodiments thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

I claim:

1. A core for use in a pressure filter leaf in which a pair of filter screens or the like are disposed against opposite faces of the core, comprising a hard, resilient, flexible, reinforcing panel formed of fiber glass, a pair of imperforate, flexible rubber coating layers, said coating layers conforming to and being bonded to the opposite faces of said panel to form an integral structure, said coating layers each having a plurality of external, integral studs providing interconnecting surface channels on the faces of said core, the thickness of said layers intermediate said studs being substantially less than the thickness of said panel, whereby said layers and said panel have substantially the same coefficient of thermal expansion and the inherent resiliency of said fiber glass panel provides a structural memory which permits said core to flex under fluid pressures exerted thereon during use and to automatically return to its original planar shape upon removal of said pressures.

2. A core as set forth in claim 1 wherein said studs are arranged in a plurality of staggered rows providing irregular drainage channels.

3. A filter leaf core adapted to be mounted in a filter leaf frame between a pair of filter screens or the like for use in a pressurizable filter tank which operates to filter a fluid under pressure, wherein the improvement comprises:

a reinforcement member of hard, resilient, fiberboard bending in response to said fluids under pressure and snapping back to its original position when the pressure of said fluid is relieved, a sheet of fiber glass matted material secured to one face of said fiberboard, and a pair of coating layers secured to each side of said reinforcing member, each of said layers having an irregular outer surface to provide a plurality of drainage channels opening into the marginal edges of the core and being relatively narrow in cross section in its area at the shallowest portion of said channels in comparison with the thickness of said reinforcement member.

4. A filter leaf core according to claim 3, further including a second sheet of fiber glass matted material secured to the opposite face of said fiberboard plate.

5. a filter leaf core adapted to be mounted in a filter frame between a pair of filter screens or the like for use in a pressurizable filter tank which operates to filter a fluid under pressure, comprising a reinforcing member of hard, resilient nonmetallic material at least partially composed of fiber glass and a fiberboard plate, said member bending in response to fluids under pressure and snapping back to its original position when said pressure is relieved, said fiberboard including means defining a plurality of apertures extending through said plate, said fiber glass comprising a pair of fiber glass laminate sheets disposed on opposite sides of said fiberboard and having integrally formed posts extending therebetween and through said holes, and a pair of coating layers secured to each side of said reinforcing member, each of said layers having an irregular outer surface to provide a plurality of drainage channels opening at the marginal edges of the core and being relatively narrow in cross section in the area at the shallowest portion of said channels in comparison to the thickness of said reinforcing member.

* * * * *